United States Patent Office 3,453,326
Patented July 1, 1969

3,453,326
2'-BENZOYL-2,2-DIHALOACETANILIDE OXIME
Arthur Stempel, Teaneck, and Leo Henryk Sternbach, Upper Montclair, N.J., assignors to Hoffmann-La Roche Inc., Nutley, N.J., a corporation of New Jersey.
No Drawing. Original application Nov. 27, 1963, Ser. No. 326,372, now Patent No. 3,321,467, dated May 23, 1967. Divided and this application Mar. 24, 1967, Ser. No. 625,625
Int. Cl. C07c *131/00*
U.S. Cl. 260—562                    7 Claims

ABSTRACT OF THE DISCLOSURE

Novel 2'-benzoyl-2,2-dihaloacetanilide oximes A are converted into 2-dihalo lower alkyl-4-phenyl quinazoline 3-oxides B which are in turn converted into 3-halo-1,4-benzodiazepin-2-one 4-oxides C. C can be converted into known pharmacologically valuable 1,4-benzodiazepines D. D are muscle relaxants, sedative and anticonvulsant agents.

RELATED APPLICATION

This application is a division of Ser. No. 326,372, filed Nov. 27, 1963, now U.S. Patent 3,321,467, in the names of Arthur Stempel and Leo Henryk Sternbach. The benefit of the effective date of this prior pending application is hereby claimed.

BRIEF DESCRIPTION OF THE INVENTION

The invention relates to novel 2'-benzoyl-2,2-dihaloacetanilide oximes and the technique by which they can be converted into chemical compounds. The last-mentioned compounds can be characterized broadly in a chemical sense as being 3-halo-1,4-benzodiazepin-2-one 4-oxides. Furthermore, the invention, in another of its aspects, relates to novel processes for preparing certain end products utilizing such chemical compounds as are characterized broadly hereinabove, known prior to the invention and useful as medicinal agents by virtue of their pharmacological activity.

DETAILED DESCRIPTION OF THE INVENTION

The novel compounds characterized broadly above as being 3-halo-1,4-benzodiazepin-2-one 4-oxides are of the formula

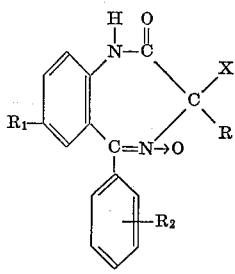

wherein $R_1$ and $R_2$ are selected from the group consisting of hydrogen, halogen, nitro, trifluoromethyl and lower alkyl; R is selected from the group consisting of hydrogen and lower alkyl and X is halogen. In a preferred aspect, R in Formula I above is hydrogen.

The novel chemical compounds of Formula I can be prepared by several different procedures. Such procedures are illustrated graphically in the following diagrammatical flow sheet wherein the symbols $R_1$, $R_2$, R and X have the same meaning ascribed thereto hereinabove and Y is selected from the group consisting of chlorine and bromine. In a preferred aspect, X is selected from the group consisting of fluorine, bromine and chlorine, most advantageously, chlorine.

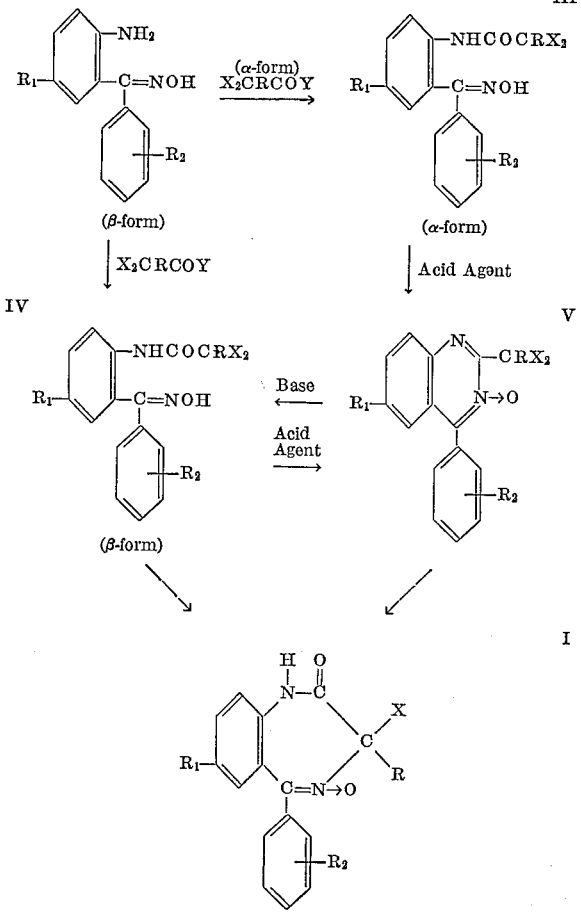

As is evident from the diagrammatical flow sheet, each of the preparative procedures illustrated involves, in its first stage, acylating the α- or the β-oxime of Formula II above with an α,α-dihalo lower acyl halide (compounds having the formula $X_2CRCOY$ above). Suitable α,α-dihalo lower acyl halides are represented by dichloroacetyl chloride, dibromoacetyl chloride and α,α-dibromopropionyl chloride and the like. The halogen atoms of the dihalo moiety can be identical or different and are preferably, as noted above, selected from the group consisting of chlorine, bromine or fluorine, advantageously, chlorine. The product resulting from the ensuing reaction is either a novel α- or a novel β-α,α-dihaloacyl ortho-amino benzophenone oxime (compounds of Formula III and Formula IV above) depending upon whether the α- or the β-oxime of the Formula II above is employed as the starting material. This reaction is advantageously effected in the presence of any suitable base which may be, for example, an alkali metal hydroxide such as sodium hydroxide, an alkaline earth metal hydroxide such as calcium or barium hydroxide and an organic base such as pyridine. An alkali metal hydroxide, e.g. sodium hydroxide, is preferably employed due to the ready availability thereof.

In preparing compounds corresponding to formula I above, compounds having the Formula III above ($\alpha,\alpha$-dihaloacyl oximes $\alpha$-form) and compounds having the Formula IV above ($\alpha,\alpha$-dihaloacyl oximes $\beta$-form) are treated with acid agents such as strong mineral acids, for example, hydrohalic acids, e.g. hydrochloric acid, sulfuric acid, phosphoric acid and the like whereby dehydration and ring closure to the quinazoline of Formula V above occurs. Similarly, the dehydration and ring closure can be effected in the presence of boron trifluoride. However, the last-mentioned procedure does not constitute part of the present invention. Compounds corresponding to formula V above are novel compounds and, thus, constitute part of the present invention.

Conversion of compounds of Formula V above to the desired compounds of Formula I above as illustrated is effected by treating compounds of formula V with a suitable inorganic base such as an alkali metal hydroxide, e.g. sodium hydroxide or an alkaline earth metal hydroxide, e.g. calcium hydroxide, advantageously in an inert organic solvent which may be a lower alkanol, for example, ethanol, acetone, a di-lower alkyloxy alkane such as dimethoxyethane or an ether such as dioxane. By this treatment, the quinazoline ring is converted into a 3-halo-1,4-benzodiazepin-2-one 4-oxide (compounds of Formula I above).

An alternate procedure for the preparation of compounds of Formula I above involves treating compounds of Formula IV above ($\beta$-oxime derivatives) with an inorganic base, for example, an alkali metal hydroxide, such as sodium hydroxide or an alkaline earth metal hydroxide, such as calcium hydroxide, here again, advantageously, in the presence of an inert organic solvent of the types exemplified hereinabove in connection with the conversion of compounds of Formula IV to compounds of Formula I.

Compounds of Formula IV can be prepared from compounds of Formula V by treating the latter with an inorganic base, e.g. an alkali metal hydroxide such as sodium hydroxide or an alkaline earth metal hydroxide. Compounds of Formula IV, prepared thusly, can be further reacted, with or without isolation from the reaction medium in which they are prepared, in the manner set out above to thereby form the corresponding compounds of Formula I above.

As is noted above, the invention, in one of its aspects, relates to novel processes for preparing certain end products known prior to the invention and which are useful as medicinal agents. Such compounds have the formula of

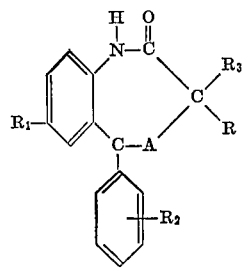

wherein $R_1$, $R_2$ and R are as above; $R_3$ is selected from the group consisting of lower alkyloxy, lower acyloxy, hydroxy and hydrogen and A is selected from the group consisting of

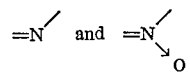

The preparation of compounds having the Formula VI above from compounds having the Formula I above is a novel process aspect of the invention and, broadly stated, involves treating a compound of Formula I above with a conversion means selected from the group consisting of a conversion means comprising a hydrogenation catalyst and hydrogen and a conversion means comprising phosphorous trichloride and a compound having the formula of $$MOR_4 \qquad VII$$

wherein M is selected from the group consisting of hydrogen, alkali metals and alkaline earth metals and $R_4$ is selected from the group consisting of lower alkyl and lower acyl.

More particularly, one of the embodiments embraced by the said novel process aspects of the invention provides a method of making a compound corresponding to Formula VI above wherein $R_3$ is lower alkyloxy and A is $=N\diagdown$. This preparation is effected by first treating compounds corresponding to Formula I above with phosphorous trichloride and, thereafter, with a compound having the Formula VII above ($MOR_4$) wherein M is hydrogen and $R_4$ is lower alkyl, e.g. a lower alkanol such as ethanol, propanol and the like.

Compounds corresponding to Formula VI above wherein $R_3$ is lower acyloxy and A is $=N\diagdown$ can be prepared by initially treating compounds of the Formula I above with phosphorous trichloride and, thereafter, with a compound of Formula VII above ($MOR_4$) wherein M is selected from the group consisting of alkali metals and alkaline earth metals and $R_4$ is lower acyl. Preferably, in this embodiment, M in Formula VII above is sodium, and the lower acyl moity of compounds of Formula VII above is acetyl. The compound so obtained can be hydrolyzed employing any convenient hydrolyzing techniques such as treatment with a base in a solvent, e.g. a lower alcholic solution, e.g. methanolic of sodium hydroxide to thereby form compounds of Formula VI above wherein $R_3$ is hydroxy and A is $=N\diagdown$.

Compounds of Formula VI above wherein $R_3$ is hydrogen and A is $=N\diagdown$ and compounds of the Formula VI above wherein $R_3$ is hydrogen and A is

can also be prepared from compounds of Formula I above by hydrogenating the latter employing any suitable hydrogenating procedure, forexample, hydrogenating in the presence of a hydrogenation catalyst such as Raney nickel, palladium and the like.

The term "lower alkyl," as used throughout the disclosure, comprehends both straight and branched chain hydrocarbon groups such as methyl, ethyl, n-propyl, ispropyl, butyl and the like. The term "halogen," as used throughout the disclosure, is intended to encompass all the four forms thereof, i.e. chlorine, bromine, fluorine and iodine. Chlorine, bromine and fluorine are preferred. The expression "lower acyl" refers to acyl groups which may be straight or branched chain such as acetyl, and the term "$\alpha$-dihalo-lower acyl" connotes an acyl group bearing dihalogen substituents on the $\alpha$-carbon atom, e.g. groups such as dichloroacetyl, dibromoacetyl, $\alpha,\alpha$-dibromoproprionyl and the like.

The foregoing is a general description of the main synthetic routes for the preparation of 3-halo-1,4-benzodiazepine 4-oxides and to the processes utilizing such compounds in the preparation of certain end products useful as medicinal agents. It will be readily apparent to one skilled in the art that variations of these procedures are possible.

The following examples are illustrative but not limitative of the compounds of this invention and the procedures for their preparation. All temperatures stated are in degrees centigrade.

Example 1

To a solution of 100 g. (0.406 moles) of 2-amino-5-chlorobenzophenone oxime ($\alpha$-form) in 2 l. of ether, 500 ml. of water was added and the stirred mixture cooled in an ice bath to 5°. The 44 ml. (67.3 g., 0.455 mole) of dichloroacetyl chloride was added slowly maintaining the temperature below +10° and keeping the reaction slightly alkaline by the simultaneous addition of 10 percent sodium hydroxide. The mixture was stirred for 30 minutes in the cold after all of the dichloroacetyl chloride had been added. The ether layer was then separated, washed twice with 500 ml. portions of cold water and dried over sodium sulfate. Most of the solvent was distilled off at atmospheric pressure and 100 ml. of benzene was added to the residue. The solvent was evaporated in vacuo to remove any water that remained. The residue was crystallized from benzene to give the oxime of 2'-benzoyl-2,2,4'-trichloroacetanilide (α-form), melting at 134–136°.

Example 2

A solution of 98 g. of the oxime of 2'-benzoyl-2,2,4'-trichloroacetanilide (α-form) in 1 l. of acetic acid was heated on a steam bath for 1½ hours while hydrogen chloride was bubbled through the solution. The reaction mixture was kept at room temperature for 16 hours and then concentrated to dryness in vacuo. The residue thus obtained was dissolved in methylene chloride and washed with dilute sodium bicarbonate and water. After drying over sodium sulfate, the solvent was distilled off. On stirring with ether, the residue crystallized to give 29 g. of crude 6-chloro-2-dichloromethyl-4-phenylquinazoline 3-oxide, melting at 105–135°. The crude product was purified by dissolving it in methylene chloride and passing it through a column of 250 g. of neutral alumina. Elution with methylene chloride gave a fraction which was recrystallized from a mixture of methylene chloride and hexane to give a purified form of the product melting at 153–154°.

Example 3

A solution of 15 ml. of 2 N sodium hydroxide in 100 ml. of 1,2-dimethoxyethane was chilled to 0–5° and 5.0 g. (14.7 mmoles) of 6-chloro-2-dichloromethyl-4-phenylquinazoline 3-oxide were added. After 30 minutes at this temperature, 100 ml. of water was added slowly, keeping the temperature below 10°. Then, 3 N hydrochloric acid was added dropwise until the solution was neutral. The crystalline product was filtered off, washed with water and dried over phosphorus pentoxide in vacuum to give 3,7-dichloro-1,3-dihydro-5-phenyl-2H-1,4-benzodiazepin-2-one 4-oxide, melting at 194–195° dec. Recrystallization from a mixture of tetrahydrofuran and hexane gave colorless needles melting at 210–211°.

Example 4

To a solution of 100 g. (0.406 mole) of 2-amino-5-chlorobenzophenone oxime (β-form) in 2 l. of ether, 500 ml. of water was added and the stirred mixture cooled in an ice bath to 5°. Then, 44 ml. (67.3 g., 0.455 mole) of dichloroacetyl chloride was added slowly maintaining the temperature below +10° and keeping the reaction slightly alkaline by the simultaneous addition of 10 percent sodium hydroxide. The mixture was stirred for 30 minutes in the cold after all of the dichloroacetyl chloride had been added. The ether layer was then separated, washed twice with 500 ml. portions of cold water and dried over sodium sulfate. Most of the solvent was distilled off at atmospheric pressure and 100 ml. of benzene was added to the residue. The solvent was evaporated in vacuo to remove any water that remained. The residue was crystallized from benzene to give the oxime of 2'-benzoyl-2,2,4'-trichloroacetanilide (β-form), melting at 159–160°.

Example 5

To a solution of 15 ml. of 2 N sodium hydroxide in 100 ml. of methanol cooled to 0–5°, 5.0 g. (14.7 mmoles) of 6-chloro-2-dichloromethyl-4-phenylquinazoline 3-oxide were added. After 30 minutes, 100 ml. of water were added and the reaction neutralized by the addition of 3 N hydrochloric acid. The crystalline product was filtered and dried over phosphoric pentoxide in vauco to give a crude product melting at 159–160° dec. The residue was added to a mixture of tetrahydrofuran and hexane. A precipitate which formed was filtered off. The mother liquor was concentrated to dryness in vacuo and the residue recrystallized from a mixture of tetrahydrofuran and hexane. Small crystals separated, then large needles began to form. The supernatant liquid was decanted and yielded long needles. After several crystallizations from tetrahydrofuran and hexane, the β-oxime of 2-benzoyl-2,2,4'-trichloroacetanilide melting at 160–162° was obtained.

Example 6

A solution of 15 ml. of 2 N sodium hydroxide in 100 ml. of 1,2-dimethoxyethane was cooled at 0–5° and 5.0 g. (14.0 mmoles) of 2'-benzoyl-2,2,4'-trichloroacetnilide oxime (β-form) was added. After 30 minutes at this temperature, the solution was diluted with 100 ml. of water and neutralized by the addition of 3 N hydrochloric acid. The crystalline product was filtered off and dried over phosphorus pentoxide in vacuo to give crude 3,7-dichloro-1,3-dihydro-5-phenyl-2H-1,4-benzodiazepin-2-one 4 oxide, melting at 206–207°. Recrystallization from a mixture of tetrahydrofuran and hexane gave colorless needles melting at 210–211.

Example 7

A solution of 15 ml. of 2 N sodium hydroxide in 100 ml. of 1,2-dimethoxyethane was chilled to 0–5° and 5.0 g. (14.7 mmoles) of 6-chloro-2-dichloromethyl-4-phenylquinazoline 3-oxide was added. The mixture was maintained at this temperature for 30 minutes yielding 3,7-dichloro-1,3-dihydro-5-phenyl-2H-1,4-benzodiazepin-2-one 4-oxide. Then, about 10–25 g. of Raney nickel was added and the mixture hydrogenated at room temperature and atmospheric pressure. When about 15 mmoles of hydrogen had been absorbed, the reaction was stopped. The catalyst was removed by filtration and the filtrate neutralized by the addition of 3 N hydrochloric acid. Most of the solvent was removed by concentration in vacuo and the residue was partitioned between methylene chloride and water. The organic layer was dried over sodium sulfate and concentrated to dryness. The residue was crystallized from a mixture of acetone and hexane to give 7-chloro-1,3-dihydro-5-phenyl-2H-1,4-benzodiazepin-2-one 4-oxide crystallizing as colorless plates melting at 228–230° dec. Recrystallization from ethanol gave a product melting at 234–235°.

Example 8

The mother liquors obtained in Example 7 were concentrated to dryness and the residue crystallized from a mixture of acetone and hexane yielding a precipitate which was separated. This mother liquor was again taken to dryness and crystallized from ethyl acetate to give 7-chloro-1,3-dihydro-5-phenyl-2H-1,4-benzodiazepin-2-one, melting at 207–209°. Recrystalliaztion from ethyl acetate gave a product melting at 212–213.5°.

Example 9

To a suspension of 4.7 g. of 3,7-dichloro-1,3-dihydro-5-phenyl-2H-1,4-benzodiazepin-2-one 4-oxide in 100 ml. of chloroform, 10 ml. of phosphorus trichloride was added. The mixture was stirred and heated to reflux for 30 minutes then concentrated to dryness in vacuo. The residue was partitioned between chloroform and ice cold dilute sodium bicarbonate solution. After drying the organic layer over sodium sulfate, the solvent was distilled off in vacuo. The residue was dissolved in 25 ml. of ethanol and the solution refluxed for 5 minutes, then concentrated to dryness in vacuo. The residue was crystallized from acetonitrile. The so-crystallized residue was then partitioned between chloroform and dilute sodium bicarbonate, dried over sodium sulfate and concentrated to dryness in vacuo. Crystallization of the residue from acetonitrile gave 7-chloro-1,3-dihydro-3-ethoxy-5-phenyl-2H-1,4-benzodiazepin-2-one, melting at 221–223°.

Example 10

A solution of 5.0 g. (15.5 mmoles) of 3,7-dichloro-1,3-dihydro - 5 - phenyl - 2H - 1,4 - benzodiazepin - 2 - one 4-oxide in 100 ml. of chloroform and 10 ml. of phosphorus trichloride was heated to reflux for 30 minutes. The mixture was then concentrated to dryness in vacuo and the residue partitioned between chloroform and water. The organic layer was washed with water and dilute sodium bicarbonate and, following drying over sodium sulfate, concentrated to dryness in vacuo. The crude product thus obtained was dissolved in 100 ml. of acetic acid containing 3.0 g. of anhydrous sodium acetate and the solution heated at 80–90° for 10 minutes. Acetic acid was distilled off in vacuo and the residue partitioned between chloroform and water. The chloroform layer was washed with water and dilute sodium bicarbonate, dried over sodium sulfate and the solvent was then distilled off in vacuo. The residue was crystallized from a mixture of methylene chloride and hexane to give 3 - acetoxy - 7 - chloro - 1,3 - dihydro - 5 - phenyl-2H-1,4-benzodiazepin-2-one, melting at 230–236° C.

Example 11

To a solution of 38 g. (0.15 moles) of the oxime of 2-amino-5-nitrobenzophenone in 1 l. of acetic acid containing 13.0 g. (0.15 moles) of sodium acetate, 0.15 moles of dichloroacetyl chloride was added slowly at room temperature with stirring. After 2 hours at room temperature, the solvent was distilled off in vacuo. The residue thus obtained was partitioned between methylene chloride and water and the organic layer was then washed with sodium bicarbonate. After drying over sodium sulfate, the solvent was distilled off and the residue crystallized from benzene to give the oxime of 2′-benzoyl-2,2-dichloro-4′-nitroacetanilide, melting at 144–145°. Further crystallization gave a product melting at 145–146°.

Example 12

To a warm solution of 10 g. (27.2 mmoles) of the oxime of 2-′benzoyl-2,2-dichloro-4′-nitroacetanilide in 400 ml. of benzene, 5 ml. of boron trifluoride etherate were added. The mixture was then heated to reflux for 6 hours. During the course of the reaction an oily product separated. After cooling, the crude reaction mixture was washed with water and dilute sodium bicarbonate, dried over sodium sulfate and concentrated to dryness in vacuo. Crystallization of the residue from a mixture of tetrahydrofuran and hexane gave 2-dichloromethyl-6-nitro-4-phenylquinazoline 3-oxide crystallizing as yellow needles and melting at 194–195° and capable of being reacted in the manner set out in Example 3 to form 3-chloro-7-nitro - 1,3 - dihydro - 5 - phenyl - 2H-1,4-benzodiazepin-2-one 4-oxide.

Example 13

To a stirred solution of 28 g. (0.1 mole) of the α-oxime of 2-amino-5-trifluoromethylbenzophenone in 500 ml. of ether, 150 ml. of water was added and the mixture chilled to 0–5°. Twenty-two ml. (34.6 g., 0.24 mole) of dichloroacetyl chloride was added slowly and, simultaneously, dilute sodium hydroxide was added to keep the reaction slightly alkaline. The reaction mixture was stirred for 30 minutes after all of the acid chloride was added. The organic layer was then separated, washed with water and dried over sodium sulfate. Solvent was then distilled off and the residue crystallized from a mixture of benzene and hexane to give the oxime of 2′-benzoyl-2,2-dichloro-4′-trifluoromethyl acetanilide melting at 129–131°.

Example 14

To a solution of 10 g. (25.6 mmoles) of the oxime of 2′-benzoyl - 2,2 - dichloro-4′-trifluoromethylacetanilide in 400 ml. of benzene, 5 ml. of boron trifluoride etherate was added and the mixture refluxed for 5½ hours. The solution became turbid after heating for about 15 minutes. After cooling, the reaction mixture was washed twice with 250 ml. of water and twice with 250 ml. of a 5 percent aqueous solution of sodium bicarbonate. The organic layer was dried over sodium sulfate and the solvent was distilled off in vacuo. On addition of 50 ml. of ether to the residue, 2-dichloromethyl-4-phenyl-6-trifluoromethyl-quinazoline 3-oxide crystallized. The product was found to have a melting point of 162–164°. It is capable of being reacted in the manner set out in Example 3 to form 3-chloro-7-trifluoromethyl-1,3-dihydro-5-phenyl - 2H - 1,4-benzodiazepin-2-one 4-oxide.

Example 15

To a solution of 122 g. (0.34 mole) of the oxime of 2′-benzoyl-2,2,4′-trichloroacetanilide (α-form) in 2 l. of benzene at about 50°, 60 ml. of boron trifluoride etherate was added slowly with stirring. The mixture was protected from atmospheric moisture with a calcium sulfate drying tube and heated to reflux. Within a few minutes, white crystals began to appear. After refluxing for 6 hours, the reaction mixture was kept overnight at room temperature. Then, 1 l. of water was added with stirring. The benzene layer was separated and washed once with 1 l. of H$_2$O and then with 2×500 ml. of 5 percent sodium bicarbonate. The aqueous layers were discarded and the organic phase was dried over sodium sulfate. Benzene was distilled off in vacuo and the yellow crystalline residue was stirred with 500 ml. of anhydrous ether and then chilled and filtered. It was thereafter dried in a vacuum oven at 40°. This gave 6-chloro-2-dichloromethyl-4-phenylquinazoline 3-oxide, melting at 150–151°. Recrystallization from a mixture of methylene chloride and hexane gave yellow plates melting at 153–154°.

Example 16

To a solution of 10 g. (28 mmoles) of the oxime of 2′-benzoyl-2,2,4′-trichloroacetanilide (β-form) in 200 ml. of benzene at 50°, there was added 5 ml. of boron trifluoride etherate. The mixture was then heated to reflux. After about 30 minutes, a solid began to crystallize. After 5 hours of refluxing, the reaction mixture was cooled to room temperature and stirred with 200 ml. of water. The organic layer was washed with dilute sodium bicarbonate, dried over sodium sulfate and the solvent then distilled off in vacuo. The residue crystallized when stirred with 50 ml. of ether to give 6-chloro-2-dichloromethyl-4-phenylquinazoline 3-oxide, melting at 147–149°.

We claim:
1. A compound having the formula

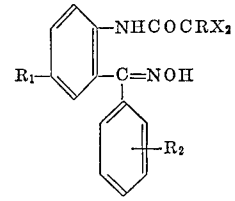

wherein $R_1$ and $R_2$ are selected from the group consisting of hydrogen, halogen, trifluoromethyl, nitro and lower alkyl; R is selected from the group consisting of hydrogen and lower alkyl; and X is halogen.

2. A compound as defined in claim 1 of the formula 2′-benzoyl-2,2,4′-trihaloacetanilide oxime.

3. A compound as defined in claim 1 of the formula 2′-benzoyl-2,2,4′-trichloroacetanilide oxime.

4. A compound as defined in claim 1 of the formula 2'-benzoyl-2,2-dihalo-4'-nitroacetanilide oxime.

5. A compound as defined in claim 1 of the formula 2'-benzoyl-2,2-dichloro-4'-nitroacetanilide oxime.

6. A compound as defined in claim 1 of the formula 2'-benzoyl-2,2-dihalo-4'-trifluoromethylacetanilide oxime.

7. A compound as defined in claim 1 of the formula 2' - benzoyl - 2,2 - dichloro - 4'-trifluoromethylacetanilide oxime.

References Cited
UNITED STATES PATENTS
3,121,074    2/1964    Keller et al. _____ 260—562

HENRY R. JILES, *Primary Examiner.*
H. I. MOATZ, *Assistant Examiner.*

U.S. Cl. X.R.
260—239, 251, 999